United States Patent [19]

Okada et al.

[11] Patent Number: 4,546,675
[45] Date of Patent: Oct. 15, 1985

[54] METHOD AND APPARATUS FOR PROCESSING TERMINAL OF INSULATOR COATED CABLES

[75] Inventors: Tokio Okada; Tsutomu Makino; Michio Takemura, all of Tokyo, Japan

[73] Assignee: Tokyo Shibaura Denki Kabushiki Kaisha, Kawasaki, Japan

[21] Appl. No.: 649,165

[22] Filed: Sep. 11, 1984

Related U.S. Application Data

[63] Continuation of Ser. No. 389,387, Jun. 17, 1982, abandoned.

[30] Foreign Application Priority Data

Jun. 23, 1981 [JP] Japan .................................. 56-96003

[51] Int. Cl.$^4$ .............................................. H02G 1/12
[52] U.S. Cl. .................................................... 81/9.51
[58] Field of Search ................... 81/9.5 R, 9.5 B, 9.51; 30/90.8, 91.1, 101, 102

[56] References Cited

U.S. PATENT DOCUMENTS

| | | | |
|---|---|---|---|
| 2,300,087 | 10/1942 | Anello | 30/91.1 X |
| 3,169,315 | 2/1965 | Mankovitz | 30/91.1 X |
| 3,748,932 | 7/1973 | Neiman et al. | 81/9.51 |
| 3,817,132 | 6/1974 | Emery et al. | 81/9.51 X |
| 3,838,612 | 10/1974 | Inami | 81/9.51 |
| 3,892,145 | 7/1975 | Richie | 81/9.51 |
| 4,261,231 | 4/1981 | Bleakley | 81/9.51 |
| 4,352,305 | 10/1982 | Rodenbeck | 81/9.51 |
| 4,367,774 | 11/1983 | Arnold et al. | 81/9.51 X |

FOREIGN PATENT DOCUMENTS 380048 9/1923 Fed. Rep. of Germany ....... 81/9.51

Primary Examiner—James G. Smith
Attorney, Agent, or Firm—Oblon, Fisher, Spivak, McClelland & Maier

[57] ABSTRACT

A running insulator coated cable is straightened in a straightening section and then passed through a length measurement section for measuring a length of cable. The cable is then temporarily held stationary, and its coating insulator is circumferentially cut at a given point. The cable is then run again, and a given portion of its coating insulator is longitudinally cut in relation to the circumferentially cut point. Two further circumferential cuts are made on the coating insulator, and a portion of coating between these circumferential cuts is longitudinally cut. The cable is then separated at a given point on a portion of cable corresponding to the latter longitudinally cut coating portion.

8 Claims, 22 Drawing Figures

FIG. 16
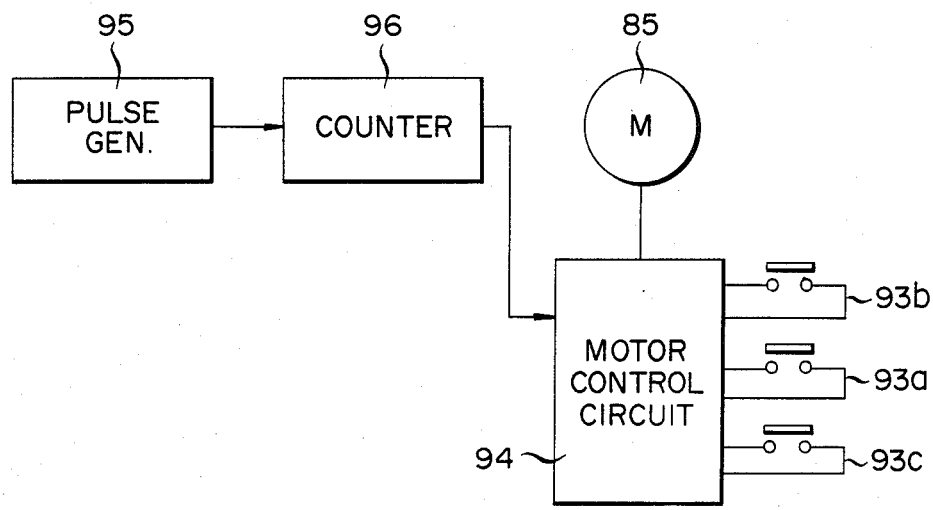
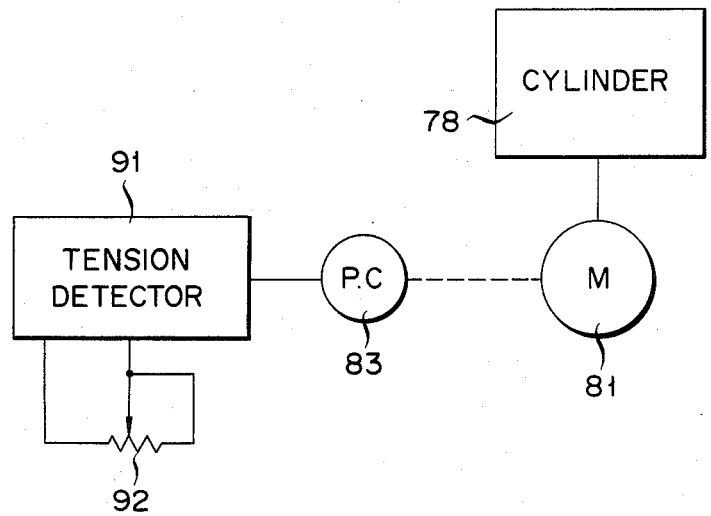

METHOD AND APPARATUS FOR PROCESSING TERMINAL OF INSULATOR COATED CABLES

This application is a continuation of application Ser. No. 389,387, filed June 17, 1982 now abandoned.

BACKGROUND OF THE INVENTION

This invention relates to a method and apparatus for processing an insulator coated cable which consists of a conductor clad with a coating insulator to obtain terminal treated cable segments having given lengths, and which has given lengths of leading and trailing portions of coating insulator cut apart to be removed and expose the conductor.

When connecting two electric apparatus with an insulator coated cable, it is necessary to sever the cable to a given length and remove the terminal portions of the coating insulator of the resultant cable segment to expose the corresponding portions of the conductor. Hitherto, this operation has been most often carried out manually. Recently, cable separators for separating measured lengths of cable have started to be used. With such cable separators, however, the method of pulling out cable when making a length measurement and the method of taking up cable afterwards are not given adequate consideration. More specifically, the operation of removing terminal portions of the coating insulator of the cable segments is not automated but rather, is carried out manually with tools. Therefore, the efficiency of the operation is low. In addition, because blades are used to cut and remove the coating insulator, there is the danger of injury of the fingers. Further, when the measured cable has a length of several ten to several hundred meters, taking up the cable segment requires a great deal of labor.

SUMMARY OF THE INVENTION

An object of this invention is to provide a method and apparatus for processing terminals of insulator coated cables, with which the operations of pulling out insulator coated cable, measuring a length of cable, taking up a cable segment, and cutting and removing terminal portions of coating insulator of the cable segment can be conducted efficiently and safely.

According to this invention, this object is attained by a method and apparatus for processing terminals of insulator coated cables, in which a cable is straightened as it is moved in the longitudinal direction. Its coating insulator is then circumferentially cut at a given point of the cable while the cable is held stationary. Subsequently, a portion of the coating insulator having a given length is longitudinally cut while the cable is being moved in order to remove the portion of the coating insulator which has been cut apart. The cable is then separated at a point in the portion thereof corresponding to the coating insulator portion which has been cut apart.

BRIEF DESCRIPTION OF THE DRAWINGS

FIG. 16 is a view illustrating the operation of the take-up section;

DETAILED DESCRIPTION OF THE PREFERRED EMBODIMENT

One embodiment of this invention will now be described with reference to the drawings.

Figure 1:
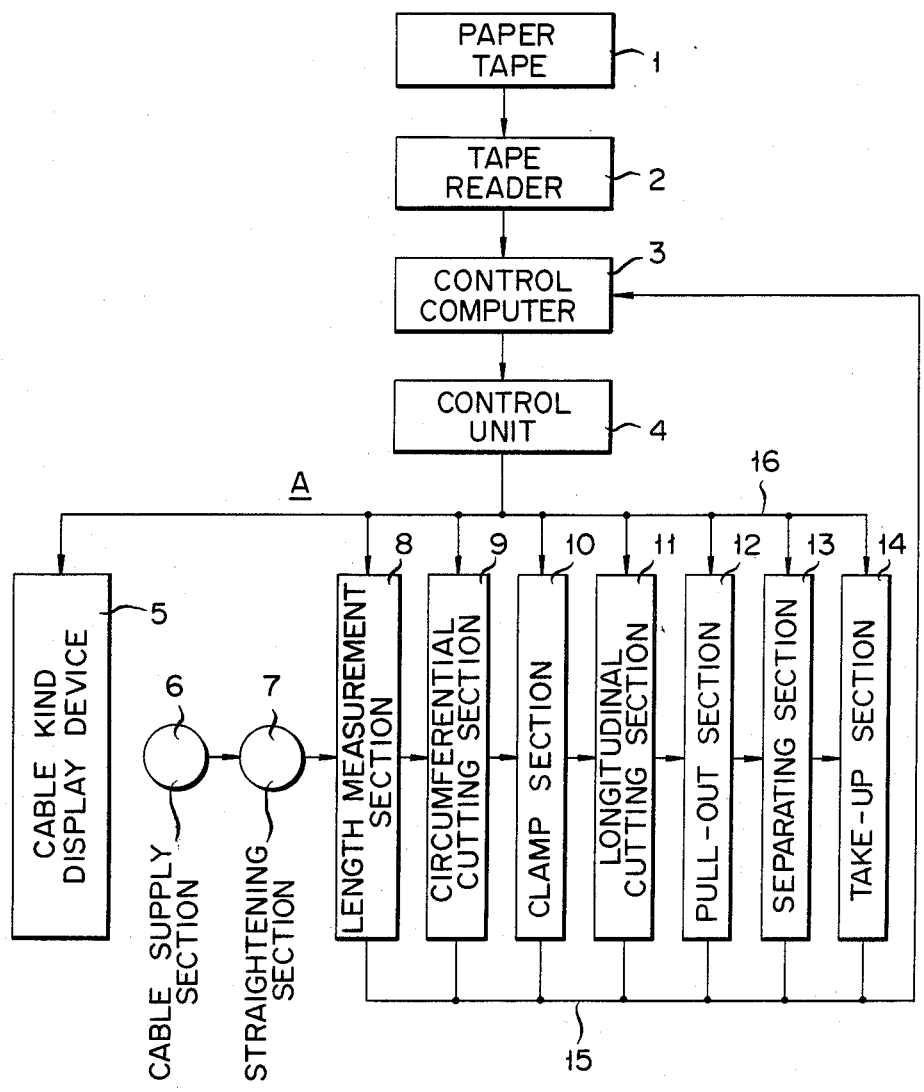
FIG. 1 is a system block diagram showing one embodiment of the invention.

FIG. 1 is a system block diagram of the apparatus according to the invention. In a data input device or similar data medium 1, for instance, a paper tape, data of the kind of cable, the length of cable segment, the length of coating insulator to be removed, the cable mark, are recorded. A terminal device 2, for instance, a tape reader, reads out data from the paper tape 1. The data of the paper tape 1 is coupled through the terminal device 2 to a control computer 3. A control unit 4 receives output of the control computer 3 and supplies control signals as operating commands to a cable kind display device 5 and an automatic working section A which will be described later in detail. The cable kind display device 5 displays the kind of cable identified by the control computer 3. The automatic working section A includes a cable supply section 6, a straightening section 7, a length measurement section 8, a circumferential cutting section 9, a clamp section 10, a longitudinal cutting section 11, a pull-out section 12, a separating section 13, and a take-up section 14. In accordance with the display on the cable kind display section 5, cable is pulled out from the cable supply section 6 through the straightening section 7, length measurement section 8, circumferential cutting section 9, clamp section 10 and longitudinal cutting section 11 to be set in the pull-out section 12. The length measurement section 8 measures a given length of the cable thus set. The control computer 3 controls the operation of the circumferential cutting section 9, clamp section 10, longitudinal cutting section 11, pull-out section 12, separating section 13 and take-up section 14 to prepare separated cables with end coating insulator portions cut apart according to preliminarily set data and a feed-back signal 15 from the length measurement section 8. The control signals from the control unit 4 are transmitted to the automatic working machine A through a line 16.

Figure 2:
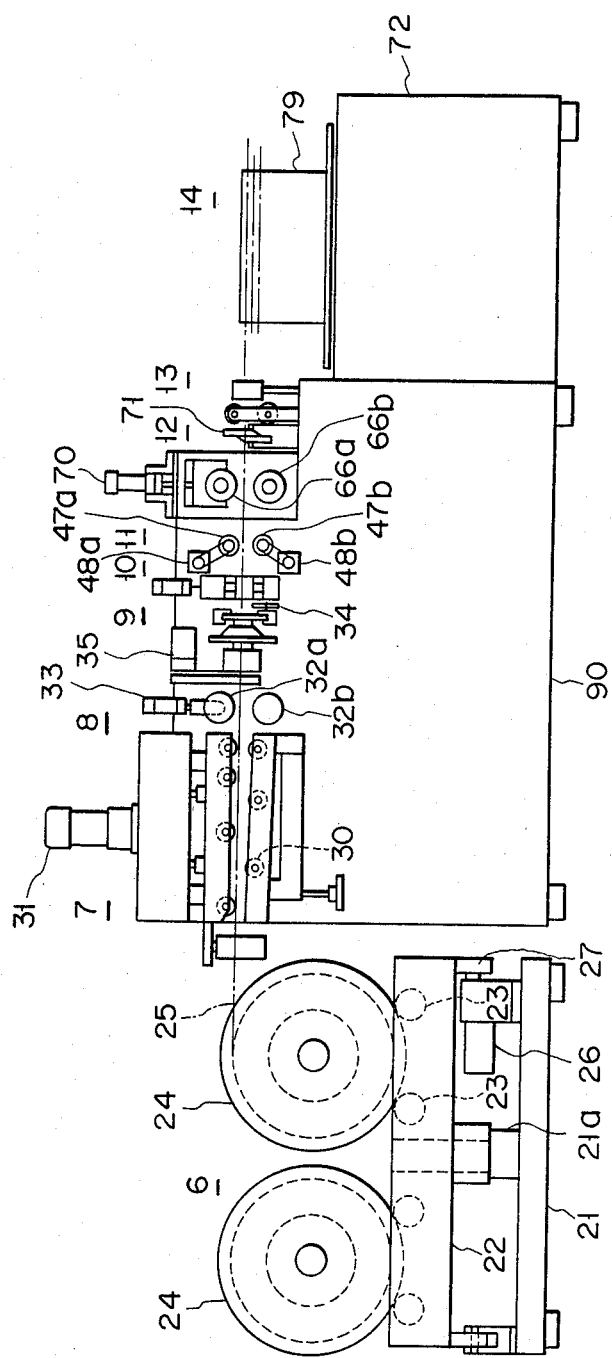
FIG. 2 is a schematic view showing the apparatus of the embodiment.

FIG. 2 is a schematic view showing the entire construction of the automatic working machine A according to the invention. The cable supply section 6 carries cable drums 24 from which the cable to be worked on can be pulled out. The section includes a base 21, a turntable 22, rollers 23 and cable drums 24. The cable 25 can be pulled out from each cable drum 24 and is supplied to the straightening section 7. More particularly, the cable 25 is wound on the cable drum 24 which is placed on associated rollers 23 mounted in the turntable 22, and its free end can be pulled out from the cable drum 24.

Figure 3:
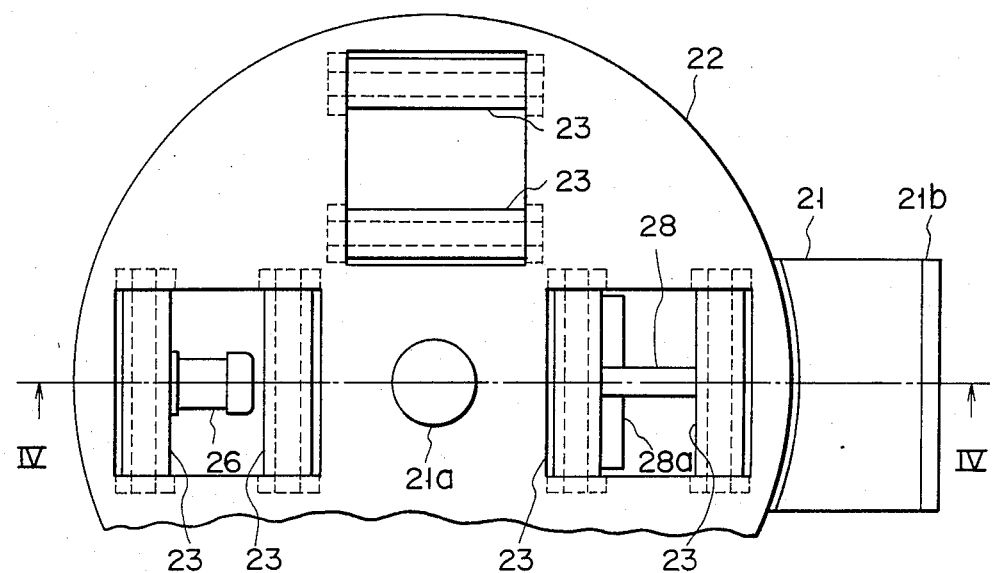
FIG. 3 is a fragmentary plan view showing a cable supply section.
Figure 4:
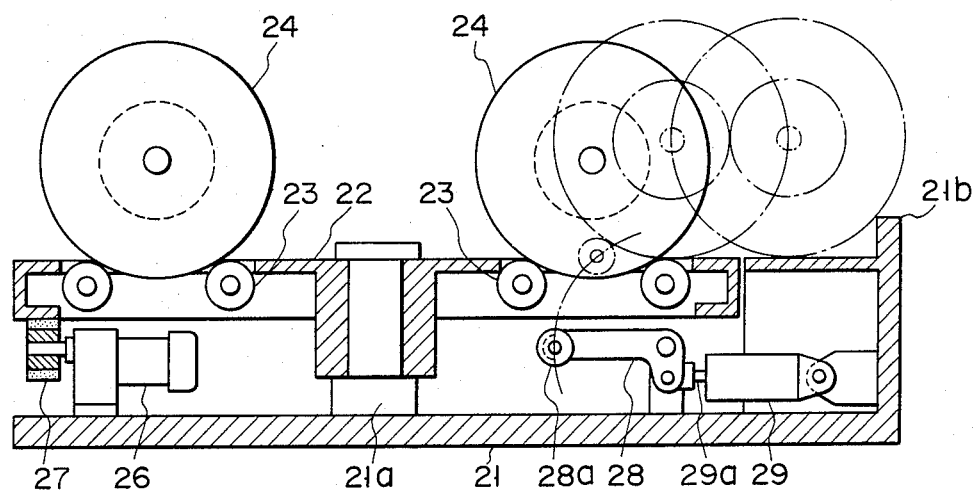
FIG. 4 is a sectional view taken along line IV—IV in FIG. 3.

FIGS. 3 and 4 show the cable supply section 6 in further detail. The turntable 22 is rotatably supported on a shaft 21a mounted on the base 21. The turntable 22 is driven by a roller 27 which is coupled to a motor 26 including a clutch, a brake and a speed reduction mechanism. An L-shaped link 28 is provided for loading and unloading the cable drum 24. The link 28 carries a roller 28a mounted at one end. A cylinder 29 rotatably mounted at one end on the base 21 has a piston rod 29a which is coupled to the other end of the link 28. A stopper 21b is provided lest the cable drum 24 should fall off the base 21.

The straightening section 7, as shown in FIG. 2, serves to correct bending of the cable 25. The section 7 includes straightening rollers 30 disposed along the path of the cable 25 and a motor 31 as a drive source when adjusting the gap between the opposed groups of correction rollers 30 according to the outer diameter of the cable 25.

The length measurement section 8 includes a pair of measurement rollers 32a and 32b. The measurement rollers 32a can be displaced by a cylinder 33. For measuring a length of the cable 25, the measurement rollers 32a and 32b are urged against the cable 25 while the cable 25 is running.

The circumferential cutting section 9 serves to cut the coating insulator (hereinafter referred to as coating) of the cable 25 at a given position in the circumferential direction. The section 9 includes a circular cutting blade 34 and a motor 35 for revolving the cutting blade 34 along the outer periphery of the cable 25.

Figure 5:
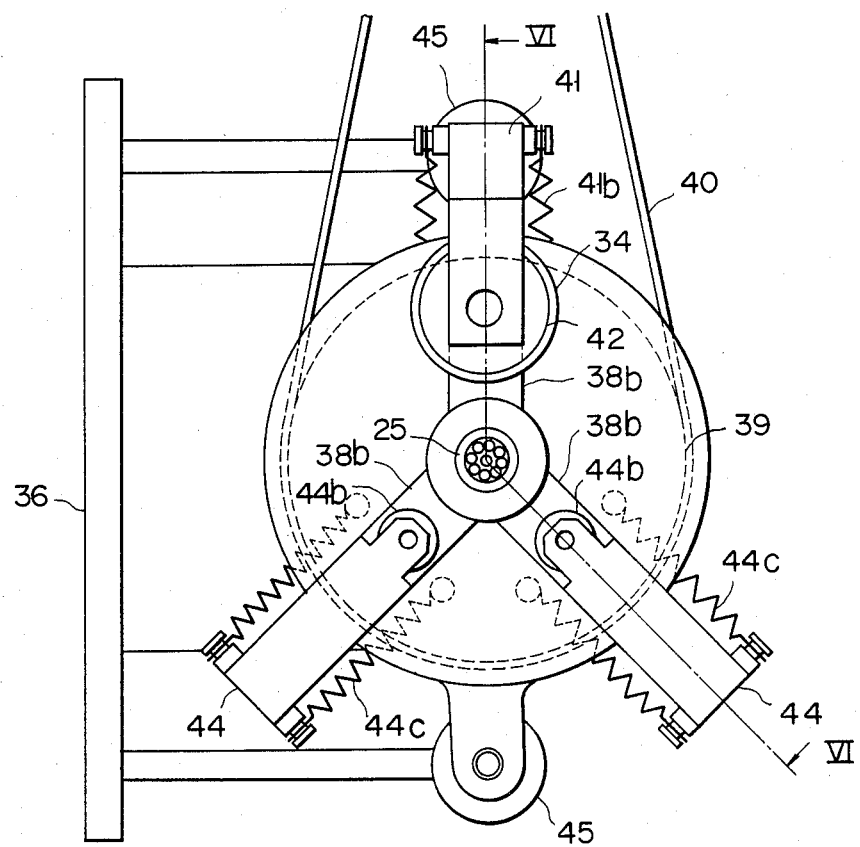
FIG. 5 is a front view showing the circumferential cutting section shown in FIG. 1.
Figure 6:
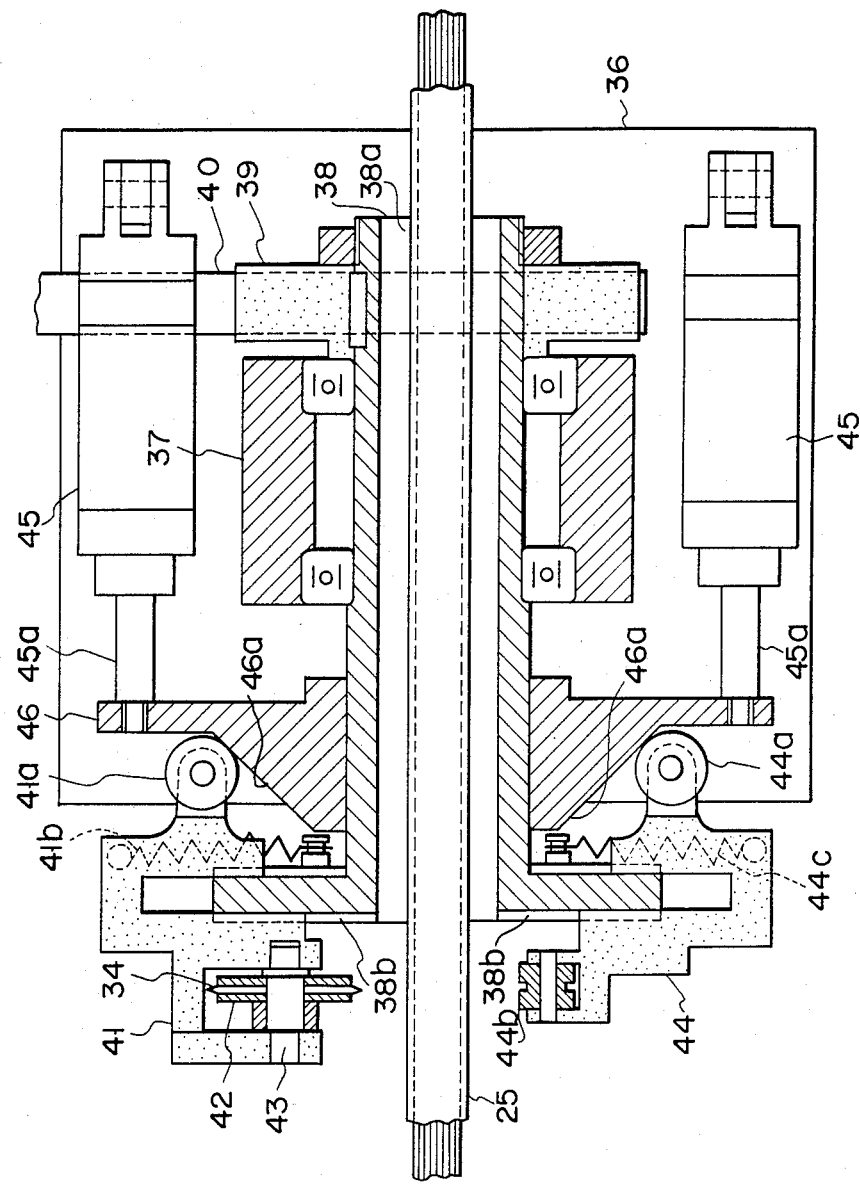
FIG. 6 is a sectional view taken along line VI—VI in FIG. 5.
Figure 7:
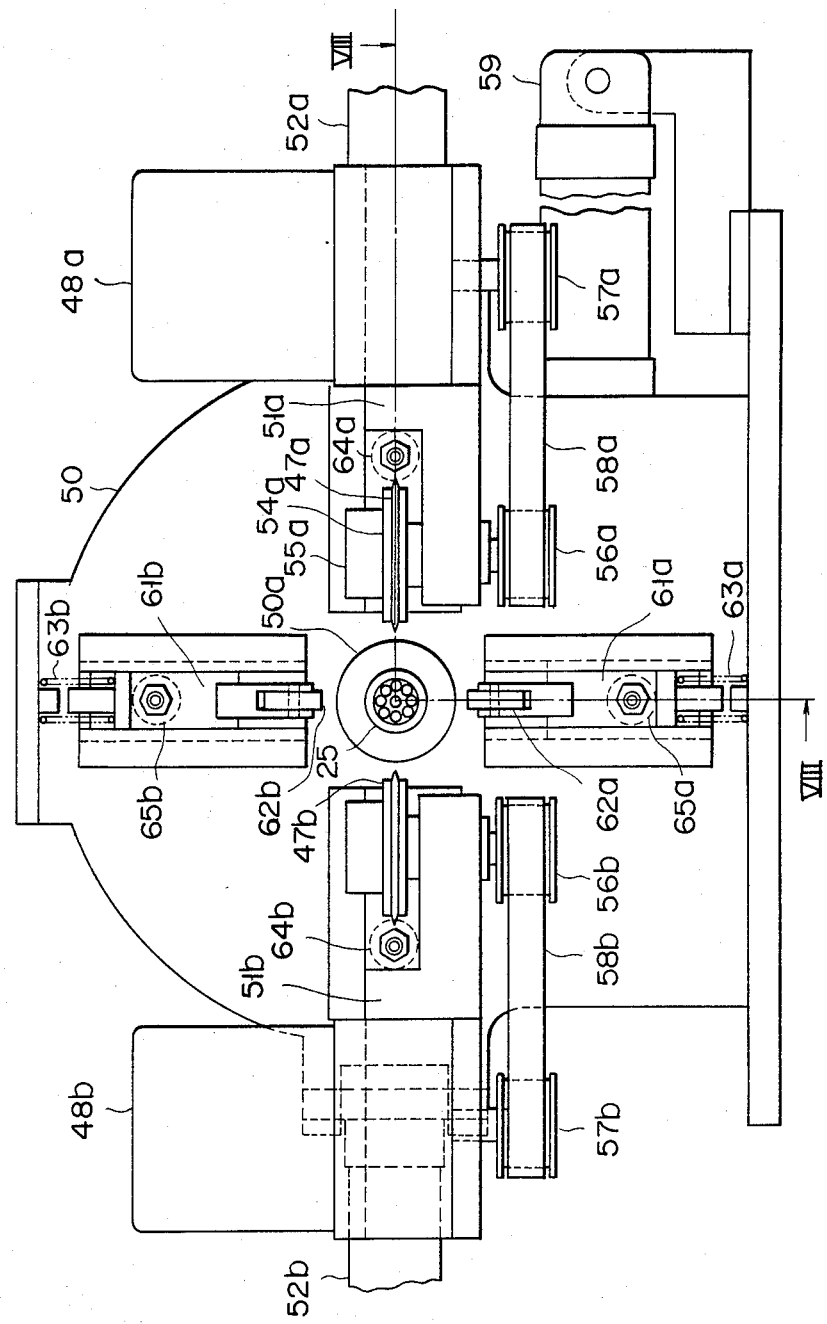
FIG. 7 is a front view showing the longitudinal cutting section shown in FIG. 1.
Figure 8:
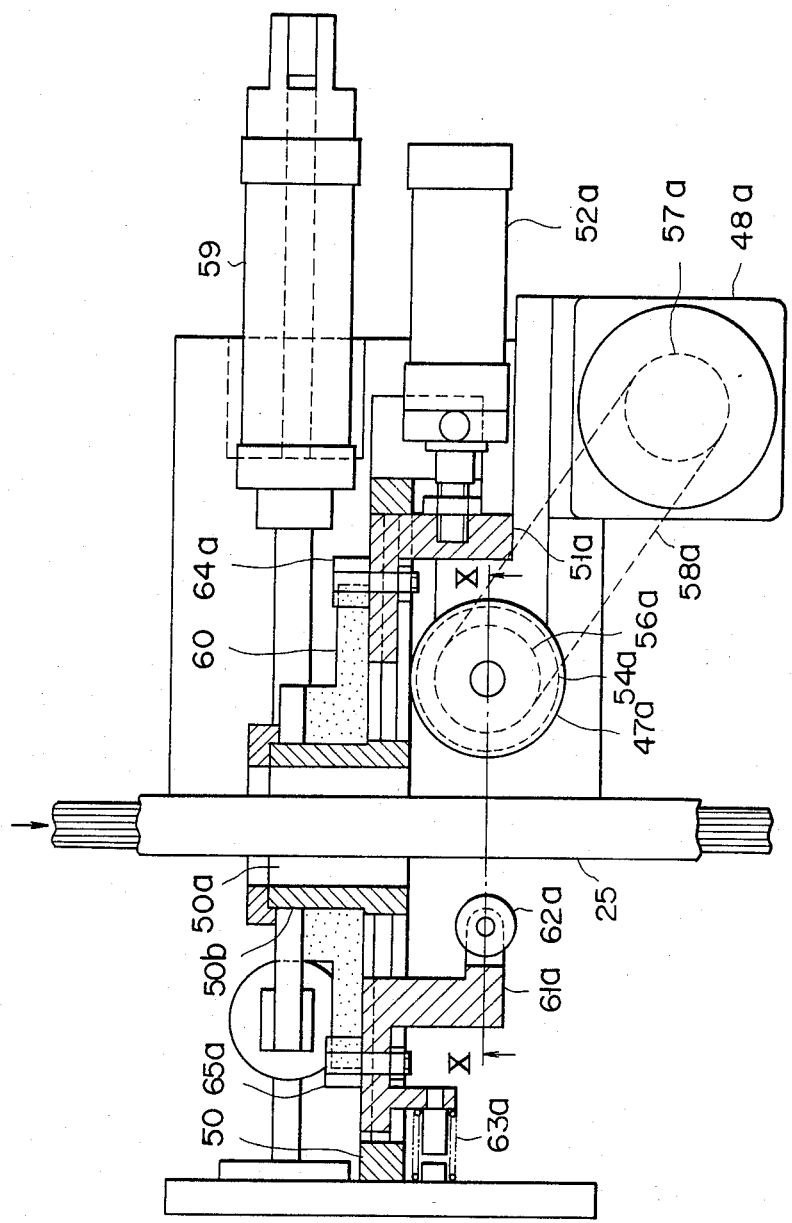
FIG. 8 is a sectional view taken along line VIII—VIII in FIG. 7.
Figure 9:
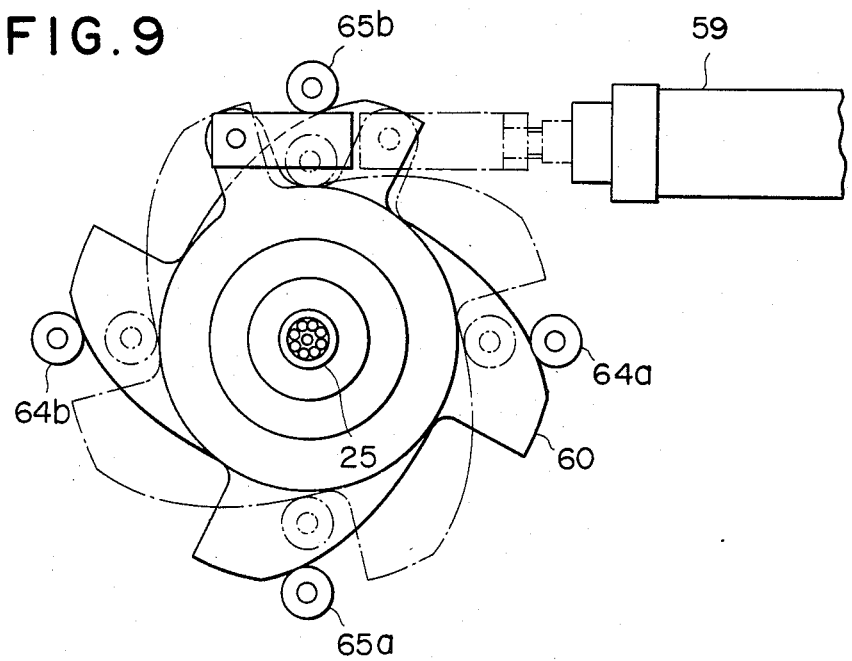
FIG. 9 is a front view showing the cam mechanism shown in FIG. 7.

FIGS. 5 and 6 show the circumferential cutting section 9 in detail. The section includes a frame 36, in which a hollow support 37 is mounted. A hollow shaft member 38 penetrates and is rotatably supported in the hollow support 37. The shaft member 38 has a hole 38a through which the cable 25 extends and a slide guide 38b formed at one end thereof. A pulley 39 is mounted on the other end of the hollow shaft member 38 for rotation in unison therewith. A belt 40 is passed round the pulley 39 and a pulley (not shown) mounted on the shaft of the motor 35. A slide 41, which carries the cutter blade 34 and a roller 41a, can slide along the slide guide 38b. The cutter blade 34 is rotatably mounted together with cutting depth setting rings 42 on a shaft 43. A slide 44 which carries rollers 44a and 44b is also provided to slide along the other slide guide 38b. The slide 41 is spring biased toward the center of the cable 25 by a spring 41b. The slide 44 is spring biased toward the center of the cable 25 by a spring 44c. Cylinders 45 are mounted at one end on the frame 36 and piston rods 45a are coupled at one end to cams 46. The cams 46 are mounted on the hollow shaft member 38 and have cam surfaces 46a formed on one side. The cam surfaces 46a are adapted to be engaged by the rollers 41a and 44a.

The clamp section 10 serves to clamp and center the cable 25. The longitudinal cutting section 11 (shown in FIGS. 7-10) serves to cut the coating of the cable 25 in the longitudinal direction. The section 11 includes circular cutter blades 47a and 47b for longitudinally cutting the coating and motors 48a and 48b for rotating the respective cutter blades 47a and 47b.

FIGS. 7 to 10 show the longitudinal cutting section 11 in detail. The section 11 includes a support frame 50 which has a hole 50a through which the cable 25 can freely pass, and is provided with a hollow cylindrical member 50b. The cutting blade 47a is carried by a slide 51a which also supports the motor 48a. The slide 51a is mounted on the frame 50 and can be moved toward and away from the center of the cable 25 by a cylinder 52a. The cutting blade 47b is carried by a slide 51b which also supports the motor 48b. The slide 51b is also mounted on the frame 50 to oppose the slide 51a and can be moved toward and away from the center of the cable 25 by a cylinder 52b.

Figure 10:
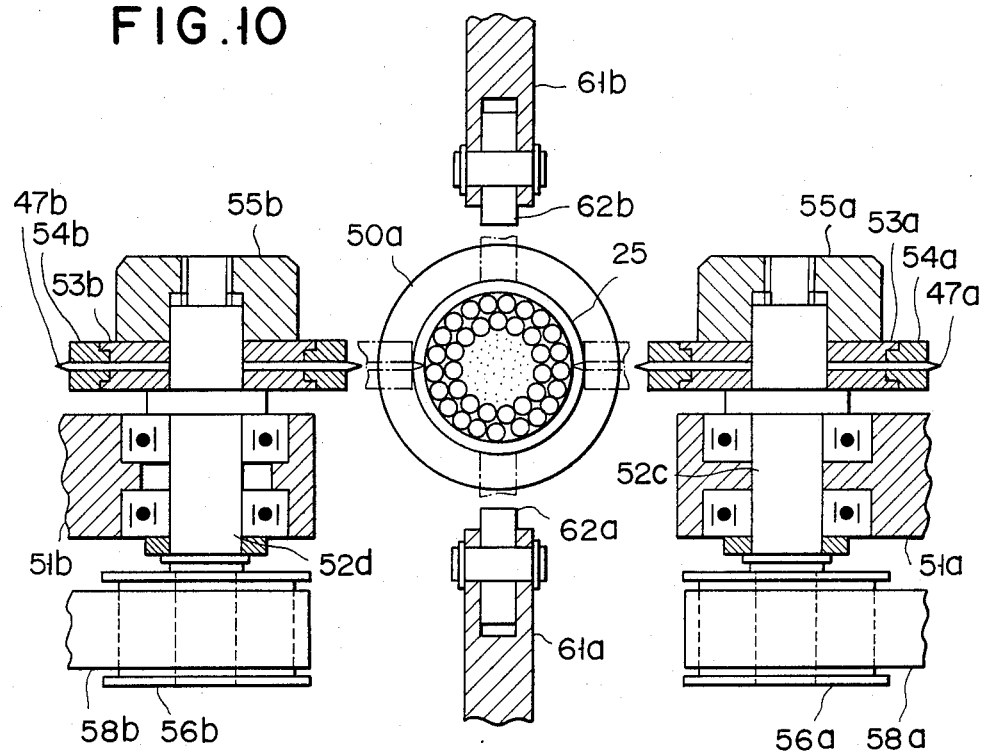
FIG. 10 is as sectional view taken along line X—X in FIG. 8.

As shown in FIG. 10, the slide 51a carries a shaft 52c supporting the cutting blade 47a. The shaft 52c also supports blade clamp rings 53a clamping the cutting blade 47a therebetween, cutting depth setting rings 54a fitted on the respective blade clamp rings 53a for rotation with respect to the blade clamp rings 53a and cutting blade 47a, and a nut 55a for securing the cutting blade 47a in co-operation with the blade clamp rings 53a. A pulley 56a is mounted on the end of the shaft 52c opposite the cutting blade 47a.

The slide 51b carries a shaft 52d supporting the cutting blade 47b. The shaft 52d also supports blade clamp rings 53b clamping the cutting blade 47b therebetween, cutting depth setting rings 54b fitted on the respective blade clamp rings 53b for rotation with respect to the blade clamp rings 53b and cutting blade 47b, and a nut 55b for securing the cutting blade 47b in co-operation with the blade clamp rings 53b. A pulley 56b is mounted on the end of the shaft 52d opposite the cutting blade 47b.

An endless belt 58a is passed around the pulley 56a and a pulley 57a mounted on the shaft of the motor 48a. An endless belt 58b is passed around the pulley 56b and a pulley 57b mounted on the shaft of the motor 48b.

A cam 60 is rotatably mounted on the hollow cylindrical member 50b of the frame 50 and driven by a cylinder 59. A further pair of slides 61a and 61b are mounted on the frame 50 to oppose each other in a direction perpendicular to the axial direction of the slides 51a and 51b and be moved toward and away from the center of the cable 25. The slides 61a and 61b carry respective rollers 62a and 62b. The slides 61a and 61b are spring biased toward the center of the cable 25 by respective springs 63a and 63b. The slides 51a and 51b carry respective rollers 64a and 64b which are adapted to engage the cam 60. The slides 61a and 61b carry respective rollers 65a and 65b which are also adapted to engage the cam 60.

Figure 11:
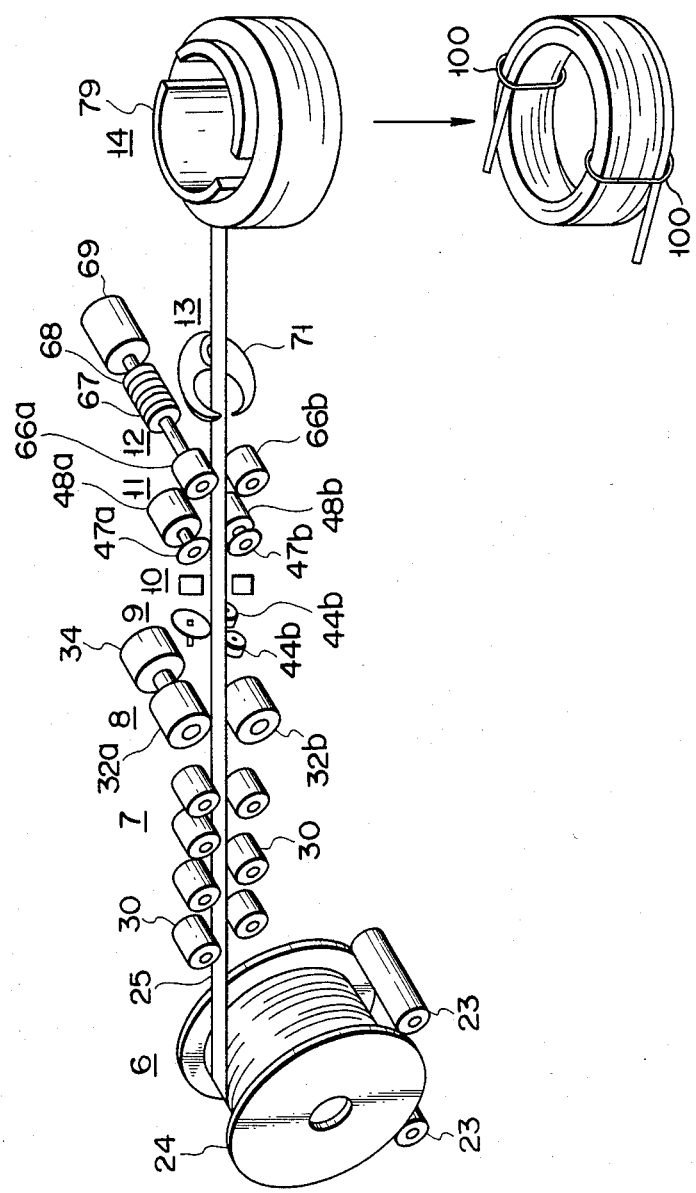
FIG. 11 is a schematic perspective view showing the pull-out section of the embodiment of FIG. 1 in relation to other component sections.

The pull-out section 12, as shown in FIG. 2, includes a pair of rollers 66a and 66b respectively disposed above and below the cable 25. The roller 66a, as shown in FIG. 11, is coupled to a motor 69 through an electromagnetic brake 67 and an electromagnetic clutch 68. The separating section 13 includes a cutter 71 which is operated by an oil hydraulic cylinder (not shown).

Figure 12:
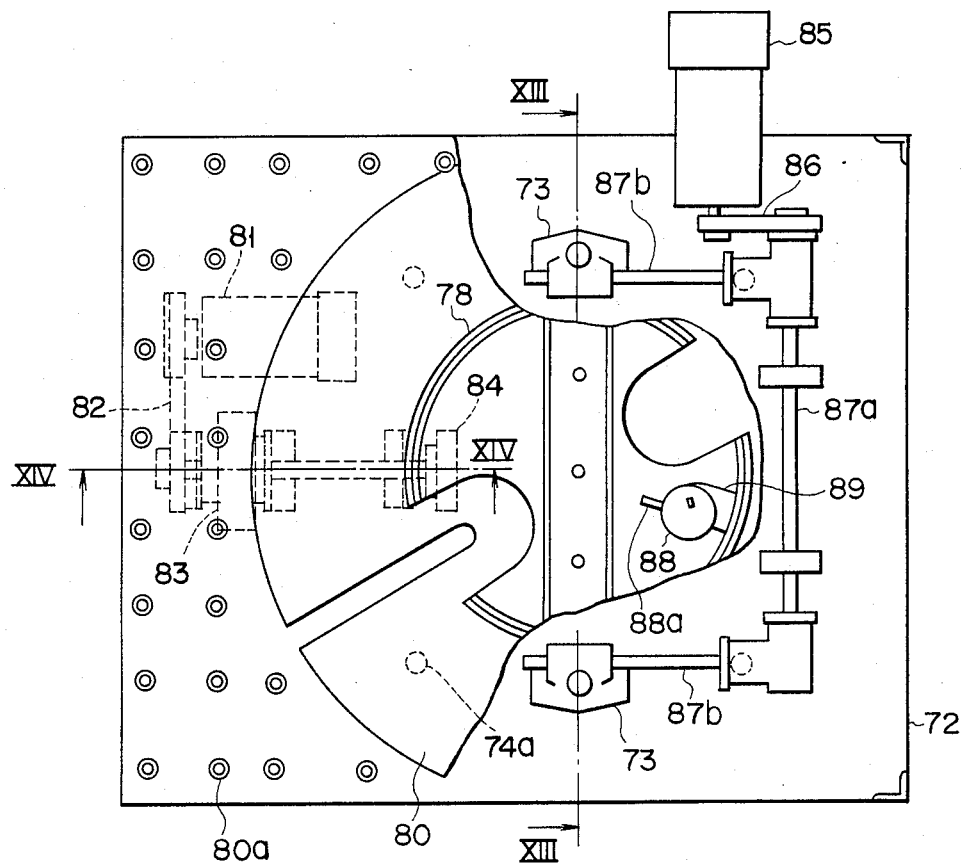
FIG. 12 is a plan view showing the take-up section shown in FIG. 1.
Figure 13:
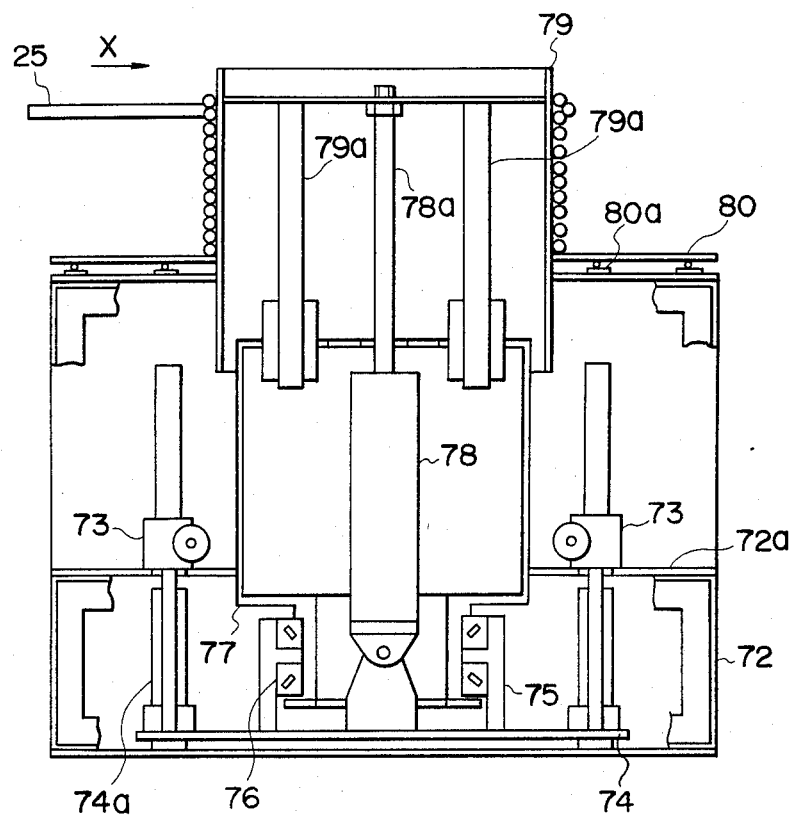
FIG. 13 is a sectional view taken along line XIII—XIII in FIG. 12.
Figure 14:
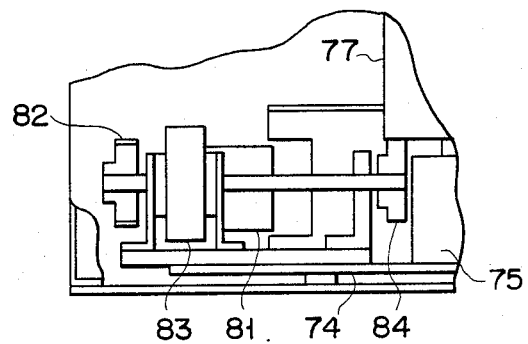
FIG. 14 is a sectional view taken along line XIV—XIV in FIG. 12.

The take-up section 14 is shown in FIGS. 12 to 14 in detail. The section 14 includes a base 72, in which a support plate 74 vertically movable by jacks 73 is accommodated. Secured to the support plate 74 is a frame 75, in which a rotary drum 77 is rotatably mounted with bearings 76. A take-up drum 79 is provided for vertical movement by a cylinder 78 supported at one end on the support plate 74. A pallet 80 is mounted on the base 72 with rollers 80a for horizontal movement. As shown in FIG. 14, the base 72 further accommodates a drive mechanism including a motor 81 mounted on the support plate 74, a clutch 83 for holding the tension in the cable 25 constant with torque transmitted from the motor 81 through an endless belt 82, and a roller 84 for transmitting torque to the rotary drum 77 through the clutch 83. Section 14 further includes another drive mechanism including a motor 85 mounted on an intermediate member 72a and drive shafts 87a and 87b for transmitting the torque of the motor 85 to the jacks 73 through an endless belt 86. On the take-up drum 79 is mounted via a frame 89 an eccentric roller 88 having a handle 88a for clamping the cable 25. The take-up drums 79 is guided by guide bars 79a when it is vertically moved. The support plate 74 is guided by guide poles 74a when it is vertically moved.

The operation of the embodiment will now be described.

Figure 15:
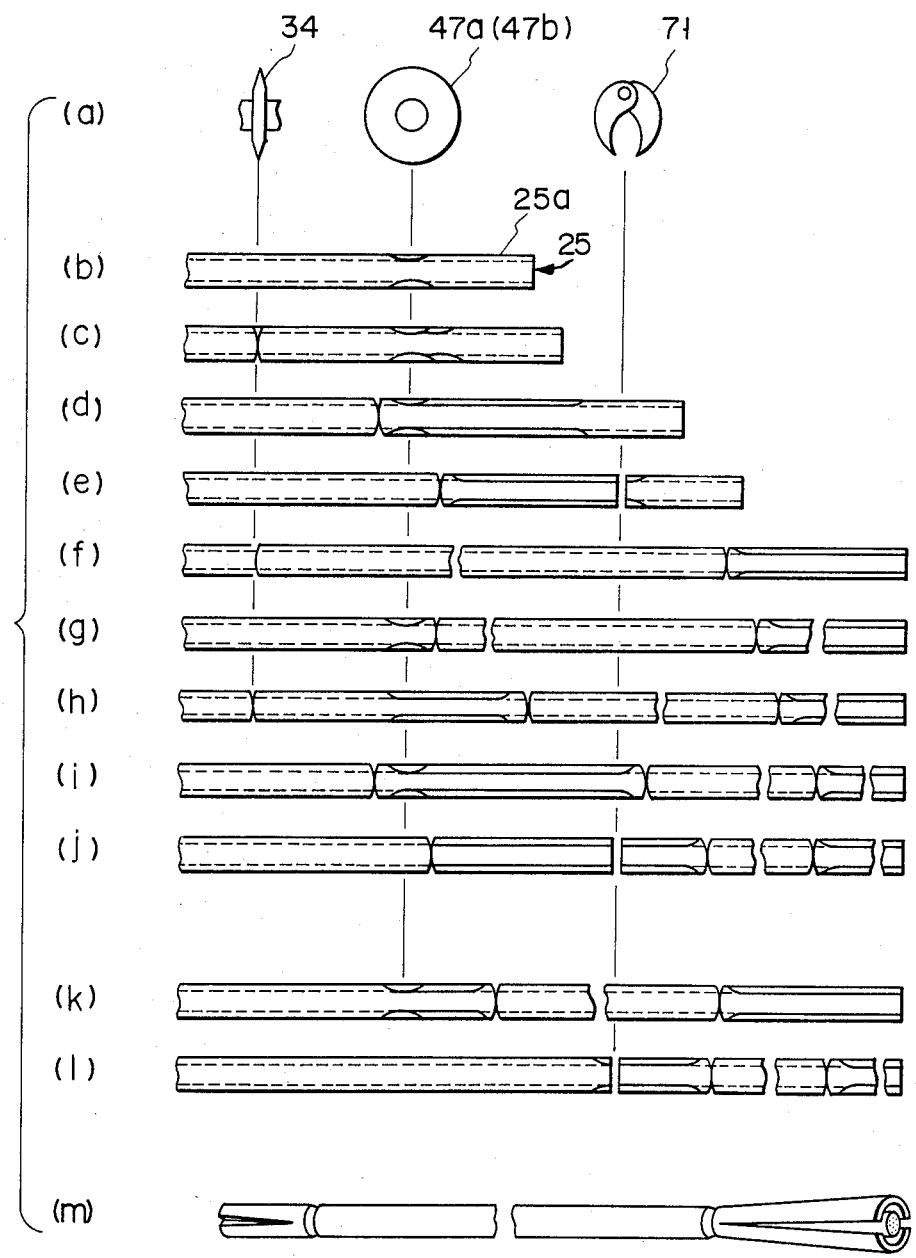
FIG. 15 is a view illustrating the operation of the embodiment of FIG. 1.

FIG. 15 illustrates the process of working on a cable to produce terminal processed cable segments. The positional relation among the circumferential cutting section cutting blade 34, longitudinal cutting section cutting blade 47a (or 47b), and cutter 71 is shown in (a) in the Figure. In the Figure, the cable take-up process is omitted to facilitate understanding of the method of cutting the coating of the cable 25. In this process, the cable 25, having been pulled out to the pull-out section 12 shown in FIG. 2 and restrained there by the pull-out rollers 66a and 66b, is worked on for producing terminal processed cable segments of given lengths.

Figure 17:
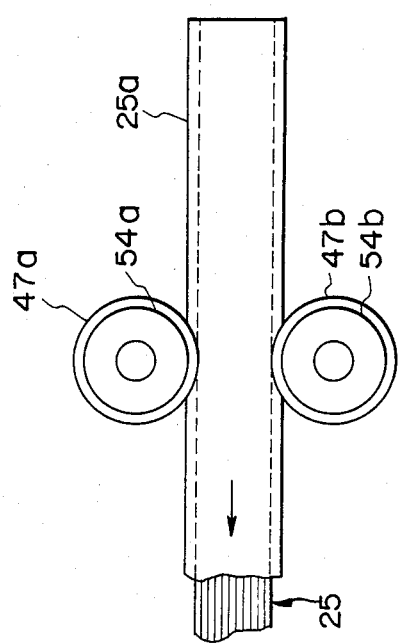
FIG. 17 is a view illustrating the operation of the longitudinal cutting section.
Figure 18:
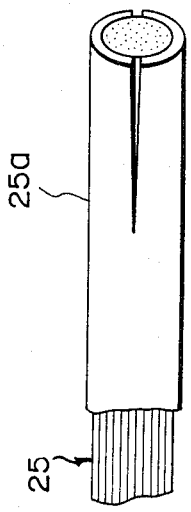
FIG. 18 is a view showing the result of the cutting operation shown in FIG. 17.

In the step shown in (b), the longitudinal cutting section 11 is operated to make an initial stage of longitudinal cutting of the coating of a leading end portion of the cable 25. At this time, the cable 25 extends through the central hole 50a of the support frame 50. The cable 25 is set such that its point from which the longitudinal cutting of coating starts is in register with the cutting blades 47a and 47b. The motors 48a and 48b are then driven to rotate the shafts 52c and 52d for rotating the cutting blades 47a and 47b. In this state, the cylinders 52a and 52b are operated to move the slides 51a and 51b toward the cable 25. Meanwhile, the slides 61a and 61b are constantly biased toward the center of the cable 25 by the compression springs 63a and 63b. At this time, the slides 51a and 51b and slides 61a and 61b are restrained against movement with their rollers 64a and 64b and rollers 65a and 65b in engagement with the cam 60. In this state, the cylinder 59 is operated to rotate the cam 60. With the rotation of the cam 60, the cutting blades 47a and 47b and rollers 62a and 62b are brought into contact with the periphery of the cable 25, thus centering the cable 25. With further rotation of the cam 60, the rollers 65a and 65b are released from the engagement. The cylinders 52a and 52b and compression springs 63a and 63b now function to let the slides 51a and 51b restrain the cable 25. In this state, the cutting blades 47a and 47b, which are being rotated by the rotational forces of the motors 48a and 48b, readily proceed while cutting the coating of the cable 25 until the rings 54a and 54b engage the coating surface. The cable 25 is then pulled out, whereby the coating of the cable 25 can be readily cut in the longitudinal direction. FIG. 17 shows the cable 25 with its coating being cut by the cutting blades 47a and 47b, and FIG. 18 shows the cable 25 with a cut portion of coating.

After the longitudinal cutting of the coating by feeding out a given length of the cable 25 has ended, the motors 48a and 48b are stopped and the cylinders 52a and 52b and cylinder 59 are returned.

In this embodiment, the cutting blades 47a and 47b are rotated by the motors 48a and 48b. However, it has been confirmed that depending upon its material, the coating can be sufficiently cut without driving the cutting blades with any rotational drive source.

Next, the cable 25 is pulled out again by operating the pull-out section 12 while holding the longitudinal cutting section 11 operative. When a point of the cable 25 corresponding to a given length of the leading end portion of the coating to be removed reaches the position of the cutting blade 34 of the circumferential cutting section 9, the operation of the pull-out section 12 is stopped. In this position, the coating is circumferentially cut by operating the circumferential cutting section 9, as shown in FIG. 15 (c). More particularly, in this step the cable 25 is secured in position by means of a clamp (not shown) with the intended point of the cable 25 in register with the cutting blade 34. The cylinder 45 is operated to move the slides 41 and 44 toward the center of the hollow shaft member 38, i.e., toward the cable 25. The cam 46 is then operated, whereby the slides 41 and 44 are moved until the cutting blade 34 mounted in the slide 41 and the rollers 44a and 44b mounted in the slide 44, being biased by the tension springs 41b and 44c, are brought into contact with the cable 25 to restrict the cable at three points. However, because the cam 46 has a further stroke, the rollers 41a and 44a are completely released from it. That is, the slides 41 and 44 can now be moved independently of the cam 46. Subsequently, the hollow shaft member 38 is rotated by starting, for instance, a motor (not shown) and transmitting the motor torque through the belt 40 and pulley 39, thus causing the cutting blade 34 and rollers 44a and 44b to revolve around the periphery of the cable 25 while restricting the cable 25. Since the slides 41 and 44 are spring biased toward the center of the cable 25 by the tension springs 41b and 44c, the cutting blade 34 wedges into the coating of the cable 25 as it rolls thereon. When the rings 42 provided on the opposite sides of the cutting blade 34 is brought into engagement with the coating surface, further wedging of the cutting blade 34 by the action of the tension spring 41b no longer takes place.

Figure 19:
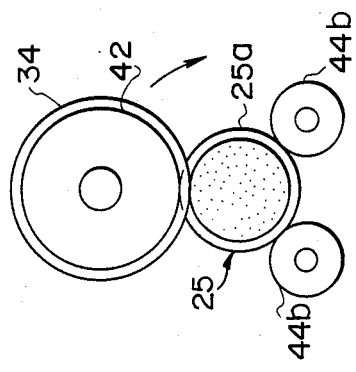
FIG. 19 is a view for explaining the operation of the circumferential cutting section.

FIG. 19 shows the relation of the cutting blade 34, rings 42, and rollers 44b to the cable 25 while the coating thereof is being cut.

When the circumferential cutting has ended, the motor coupled through the belt 40 is stopped and the cylinder 45 is returned. The cam 46 thus engages the rollers 41a and 44a and moves the slides 41 and 44 radially outwards to release the cutting blade 34 and rollers 44b from the cable 25.

Figure 20:
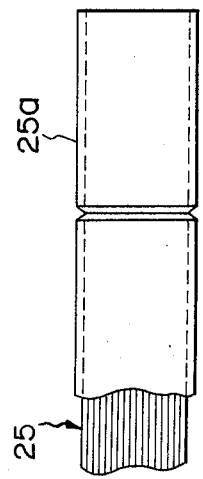
FIG. 20 is a view showing the result of the cutting operation shown in FIG. 19.

FIG. 20 shows the cable 25 with its coating 25a circumferentially cut by the above operation.

The coating 25a of the cable 25 is usually made of soft polyethylene, polyvinyl chloride or synthetic rubber. The inventors have confirmed that the cutting blade 34 sufficiently wedges into these materials with the action of the tension springs 41b and 44c. It has also been confirmed that a thick coating can be sufficiently cut by rotating the hollow shaft member 38, i.e., the cutting blade 34, several times. Further, it is possible to cut the coating with the so-called knife-edge action of the cutting blade 34.

Figure 21:
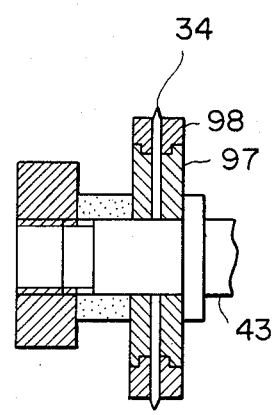
FIG. 21 is a sectional view showing a different example of the circumferential cutting section.
Figure 22:
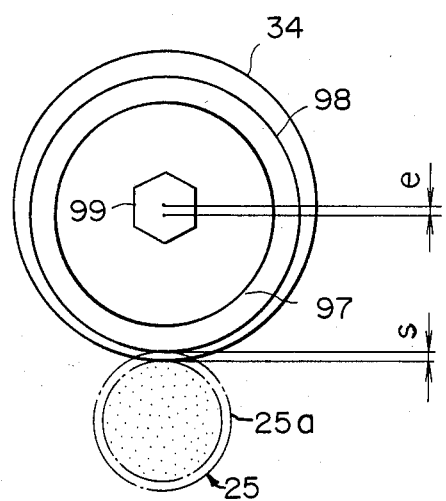
FIG. 22 a front view showing a further example of the circumferential cutting section.

As shown in FIG. 21, the cutting blade 34 can be secured to the shaft 43 in a state clamped between clamp rings 97 with rotary rings 98 rotating to roll over the surface of the coating of the cable 25. Further, it is possible to make the cutting depth S variable, as shown in FIG. 22. Here, the clamp rings 97 are mounted on a polygonal shaft 99 such that they are eccentric to the cutting blade 34 by an amount e.

When the circumferential cutting has ended, the circumferential cutting section 9 is restored to its initial inoperative state. Thereafter, the coating is cut in the longitudinal direction up to the vicinity of the circumferentially cut point, as shown in (d) in FIG. 15. More particularly, in this step the longitudinal cutting section 11 is rendered operative and the pull-out section 12 is operated to pull out the cable 25 by a given length. When this step has been completed, the pull-out is stopped and the longitudinal cutting section 11 is then restored. Thereafter, a leading end portion of the cable 25, which remains clad with the coating, is separated as waste by the cutter 71 in the separating section 13, as shown in (e). More particularly, in this step the cable 25 is pulled out until the point of separation reaches the position of the cutter 71. The separating section 13 is then operated. The pull-out section 12 then pulls out a given length of cable 25. When a point determining a length of the trailing end portion of the coating of the cable 25 to be removed reaches the position of the cutting blade 34, the pull-out section 12 is stopped. In this position, circumferential cutting is effected by operating the circumferential cutting section 9, as shown in (f). Afterwards, the cable 25 is further pulled out by a given length by operating the pull-out section 12. Then, as shown in (g), the longitudinal cutting section 11 is operated again to effect an initial stage of the longitudinal cutting of a leading end portion of the coating of the cable 25 which is to be removed for obtaining the next terminal-processed cable segment. Circumferential cutting for the second terminal-processed cable segment is conducted as shown in (h). More particularly, in this step, a given length of the cable 25 is pulled out by operating the pull-out section 12 again. When a point determining the length of the leading end portion of coating to be removed reaches the circumferential cutting section 9, the pull-out is stopped. In this position, the circumferential cutting section 9 is operated to effect circumferential cutting. Next, longitudinal cutting of the coating including the trailing end portion thereof for the first cable segment and the leading end portion thereof for the second cable segment, is conducted as shown in (i). More particularly, in this step, the longitudinal cutting section 11 is operated, and is restored when a given length of cable is pulled out. The cable 25 is then further pulled out. When a point of the cable 25 determining the length of the first cable segment comes to the position of the cutter 71, the pull-out is stopped, and the separating section 13 is operated to separate the cable 25 as shown in (j).

Through the above steps of operation, the first terminal-processed cable segment having a given length and also having specified lengths of leading and trailing end portions of the coating cut is obtained. In order to obtain the second and following terminal-processed cable segments, the steps (f), (g), (h), (i) and (j) are repeated by operating the relevant mechanisms from the state after the completion of step (e). In this way, a plurality of terminal-processed cable segments having given lengths can be obtained. In order to separate the last of the terminal-processed cable segments, unless the length of the leading end portion of the coating for removal for the next terminal-processed cable segment has been specified, steps (f), (g), (k) and (j) are executed in succession. In the step (k), the longitudinal cutting is stopped when a point determining the length of the trailing end portion of the coating for removal for the last terminal-processed cable segment comes to the longitudinal cutting section. In step (l), the cable is separated with the end of the trailing end portion of the coating for removal in register with the cutter 71.

A terminal-processed cable segment which is obtained in the above operation is shown in (m). Since circular cutting blades are used as the longitudinal cutting blades, the cut-apart coating end portions remain united together by a slight non-cut longitudinal portion, but they can be easily separated by hand, for instance. The above operation is controlled in the manner as shown in the system block diagram of FIG. 1.

When processing cable to produce terminal processed cable segments having great lengths, the cutting of end portions of the coating for consecutive cable segments is performed with a leading portion of cable wound on the take-up section 14. In order to take up cable, the take-up drum 79 is first raised by raising the rod 78a of the cylinder 78 as shown in FIG. 13. Then the leading end of the cable 25 is clamped on the inner side of the take-up drum 79 with the eccentric roller 88. Thereafter, the motor 81 is rotated, whereby the rotary drum 77 is rotated through the clutch 83 and roller 84 to rotate the take-up drum 79. The cable 25 is thus wound on the take-up drum 79. When the cable 25 being taken up in the direction of X (FIG. 13) stops moving because of, for example, coating cutting, the tension in the cable portion leading to the take-up drum 79 increases. When the tension exceeds a predetermined value, a tension detector 91 as shown in FIG. 16 operates a power clutch (P.C.) 83, thus providing a constant torque transmitted to the rotary drum 77. Thus, the cable 25 is held under constant tension. The tension under which the cable is held can be adjusted by a tension adjustment resistor 92. When the cable 25 resumes movement in the direction of arrow X after the completion of the preceding treatment step, rotation of the take-up drum 79 is resumed to take up the cable 25. When a limit switch 93a detects one rotation of the rotary drum 77, the motor 85 is rotated by a motor control circuit 94. With the rotation of the motor 85, the support plate 74 is raised through the jacks 73. As the support plate 74 is raised, a pulse generator 95, which is constituted by a slit plate (not shown) mounted on either one of the jacks 73 and a photoelectric element (not shown), generates pulses. A counter 96 counts down according to pulses generated from the pulse generator 95. The support plate 74 is raised until the count is reduced to zero, i.e., until the number of pulses generated from the pulse generator 95 corresponds to a preset pulse number. When a limit switch 93b detects the upper limit of the stroke of the support plate 74, the motor control circuit 94 reverses the motor 85 to lower the support plate 74. When a limit switch 93a detects the lower limit of the stroke of the support plate 74, the support plate 74 is again raised by the motor control circuit 94. The motor control circuit 94 may be of any well-known construction so long as it can rotate both forwardly and reversely and stop the motor 85. With the repeated upward and downward movement of the support plate 74 in the manner as described, the cable 25 can be uniformly wound around the take-up drum 79 in several layers.

When the cable 25 is completely wound, the support plate 74 is brought to a predetermined position by forwardly or reversely rotating the motor 85. Cable 25 which has been wound is bound by means of strings 100, as shown in FIG. 11. Subsequently, the take-up drum 79 is withdrawn from the wound cable 25 by lowering the rod 78a of the cylinder 78. Wound cable 25 now held on the pallet 80 may be transferred therewith to the next step station (not shown).

As has been described in the foregoing, according to the invention, it is possible to measure pull-out lengths of cable according to a length measurement control program which has been input in advance and to freely set cut lengths of leading and trailing end portions of coating of cable segments to be removed. Further, it is possible to set almost any length of a cable segment. In addition, taking up the cable pulled out from the pull-out section in the constant tension take-up section facilitates the handling of cable in the next step station. Still further, since portions of coating longitudinally cut apart remain united by a slight, whole longitudinal portion adjacent to the circumferential cut, they do not naturally separate. Thus, even with a multi-conductor cable, the conductors will remain bundled together after the cutting of the coating. This is desirable for the automation of the processing. Recently, there have been many cases in which various control panels are interconnected with cables. Also, there is a demand for reducing the processing period. In this connection, when preparing terminal-processed cable segments, it is possible to produce cables by directly inputting necessary data.

What we claim is:

1. An apparatus for pressing terminals of insulator coated cables, said apparatus comprising:
   (a) a cable supply section for supplying cable;
   (b) a straightening section for straightening sections of cable;
   (c) a length measurement section for measuring lengths of cables;
   (d) a circumferential cutting section for circumferentially cutting the insulator coated on the cable while the cable is temporarily stopped, said circumferential cutting section including:
      (i) a disk-like cutting blade;
      (ii) a pair of clamping rings mounted on a polygonal shaft, said pair of clamping rings clamping said cutting blades so as to prevent rotation of said cutting blades; and
      (iii) a pair of rotary rings one of which is rotatably mounted on each of said clamping rings adjacent to said cutting blade, said rotary rings being sized and shaped so that an outer periphery portion of said cutting blade protrudes between said rotary rings by a prescribed cutting depth;
   (e) a longitudinal cutting section for longitudinally cutting the insulator coated on the cable while the cable is moving longitudinally;
   (f) a pull-out section provided adjacent to said longitudinal cutting section for pulling out the cable from said longitudinal cutting section; and
   (g) means for severing the exposed conductors of the cable,
   (h) said circumferential cutting section, said longitudinal cutting section, and said pull-out section being interrelated so that longitudinal slits in the insulator coated on the cable do not quite connect with circumferential slits in the insulator, whereby the slit end sections of the insulator remain united by a short non-cut longitudinal section.

2. The apparatus for processing terminals of insulator coated cables according to claim 1, wherein said longitudinal cutting section includes two rotary circular cutting blades adapted to strike the cable in parallel with the longitudinal direction thereof, means for setting said rotary circular cutting blades in opposed positions on the opposite sides of the cable, and means for causing relative movement of the cable and rotary circular cutting blades for a given distance in the longitudinal direction of the cable.

3. The apparatus according to claim 1, which further comprises a take-up section including a take-up drum for winding up the cut cable having a predetermined length on the take-up drum.

4. The apparatus according to claim 1, wherein said cable supply section includes a plurality of drums on which different kinds of cables are wound for selectively applying one of the cables to said straightening section.

5. Apparatus as recited in claim 1 wherein said clamping rings are mounted eccentrically on said polygonal shaft, whereby the cutting depth of said cutting blade can be varied.

6. Apparatus for stripping insulation from cables comprising a central conductor portion and an insulator surrounding the central conductor portion, said apparatus comprising:
   (a) a cable supply section for supplying cables;
   (b) a straightening section for straightening cables supplied by said cable supply section;
   (c) a length measurement section for measuring lengths of the cable as they pass said length measurement section;
   (d) a circumferential cutting section for making a circumferential cut through the insulator at a first point on the cable and again at a second point on the cable spaced from said first point;
   (e) a longitudinal cutting section for making a plurality of longitudinal cuts through the insulator beginning at a third point adjacent to but spaced from said first point on the cable and extending to a fourth point adjacent to but spaced from said second point on the cable as the cable moves past said longitudinal cutting section; and
   (f) means for feeding the cable past said longitudinal cutting section while the plurality of longitudinal cuts are being made, so that the distance between said first and second points on the cable is arbitrarily and continuously variable.

7. Apparatus as recited in claim 6 and further comprising means for cutting through the cable at a selected point between said first and second points on the cable.

8. Apparatus as recited in claim 6 wherein said circumferential cutting section comprises:
(a) a frame;
(b) a hollow shaft member mounted in said frame, said hollow shaft member being sized and shaped so that cable can pass longitudinally therethrough;
(c) a radial cam mounted for axial movement on said hollow shaft member;
(d) a plurality of axially symmetric slides mounted for radial movement on said hollow shaft member;
(e) a cutter mounted on one of said plurality of axially symmetric slides in position to make a circumferential slit in the cable when said one of said plurality of axially symmetric slides is in a radially inward position;
(f) at least one support roller mounted on another one of said plurality of axially symmetric slides in position to support the cable when said other one of said plurality of axially symmetric slides is in a radially inward position;
(g) a cam follower mounted on each of said plurality of axially symmetric slides in position to engage said radial cam;
(h) means for biasing each of said plurality of axially symmetric slides radially inwardly;
(i) means for moving said radial cam axially on said hollow shaft member;
(j) said radial cam being sized and shaped so that, when said means for moving said radial cam axially on said hollow shaft member moves said radial cam in one axial direction, said plurality of axially symmetric slides move radially outwardly against the force of said means for biasing each of said plurality of axially symmetric slides radially inwardly, and, when said means for moving said radial cam axially on said hollow shaft member moves said radial cam in the opposite axial direction, said plurality of axially symmetric slides move radially inwardly under the urgings of said means for biasing each of said plurality of axially symmetric slides radially inwardly; and
(k) means for rotating said plurality of axially symmetric slides, and, consequently, said cutter and said at least one support roller circumferentially around said hollow shaft member.

* * * * *